(12) United States Patent
Zugen et al.

(10) Patent No.: US 11,540,455 B2
(45) Date of Patent: Jan. 3, 2023

(54) BLOWER WITH IMPROVED BALANCE AND CONSTRUCTION

(71) Applicant: HUSQVARNA AB, Huskvarna (SE)

(72) Inventors: Ni Zugen, Suzhou (CN); Ming Yang, Suzhou (CN); Li Li, Suzhou (CN); Chad Jones, Mount Holly, NC (US); Garrett Sherman, Huntersville, NC (US); Jeffrey C. Hickman, Concord, NC (US); David Lawrence Estey, Huntersville, NC (US)

(73) Assignee: HUSQVARNA AB, Huskvarna (SE)

( * ) Notice: Subject to any disclaimer, the term of this patent is extended or adjusted under 35 U.S.C. 154(b) by 293 days.

(21) Appl. No.: 16/770,146

(22) PCT Filed: Dec. 6, 2017

(86) PCT No.: PCT/CN2017/114873
§ 371 (c)(1),
(2) Date: Jun. 5, 2020

(87) PCT Pub. No.: WO2019/109278
PCT Pub. Date: Jun. 13, 2019

(65) Prior Publication Data
US 2020/0375124 A1    Dec. 3, 2020

(51) Int. Cl.
*A01G 20/47* (2018.01)
*F04D 19/00* (2006.01)
*F04D 25/06* (2006.01)

(52) U.S. Cl.
CPC ........... *A01G 20/47* (2018.02); *F04D 19/002* (2013.01); *F04D 25/0673* (2013.01); *F05D 2240/20* (2013.01); *F05D 2260/15* (2013.01)

(58) Field of Classification Search
CPC ...... F04D 19/00; F04D 19/02; F04D 29/4293; F04D 29/522; F04D 29/542;
(Continued)

(56) References Cited

U.S. PATENT DOCUMENTS

| 4,945,604 A * | 8/1990 | Miner ................... A47L 9/2884 15/410 |
| 2012/0076672 A1* | 3/2012 | Binder ................. F04D 25/064 417/234 |

(Continued)

FOREIGN PATENT DOCUMENTS

| CN | 106231970 A | 12/2016 |
| CN | 107072451 A | 8/2017 |
| EP | 2679828 A2 | 1/2014 |

OTHER PUBLICATIONS

International Search Report and Written Opinion for International Application No. PCT/CN2017/114873 dated Aug. 30, 2018.
(Continued)

*Primary Examiner* — Christopher Verdier
*Assistant Examiner* — Maxime M Adjagbe
(74) *Attorney, Agent, or Firm* — Burr & Forman LLP

(57) ABSTRACT

A blower (100) includes a blower attachment housing (112), a power head housing (122) having a handle (130) operably coupled thereto, a motor (140) disposed in the power head housing (122), a fan (160) disposed in the blower attachment housing (112), a battery (150), and an intake chamber (174) disposed between the motor (140) and the fan (160) to enable the air to enter the blower (100) between the motor (140) and the fan (160).

19 Claims, 12 Drawing Sheets

(58) Field of Classification Search
CPC .... F04D 29/545; F04D 29/547; F04D 29/701; F04D 29/703; F04D 29/541; F04D 29/0405; F04D 29/054; F04D 25/084; F04D 25/086; F04D 25/0673; A01G 20/47; A47L 5/14; A47L 5/15; A47L 5/24; A47L 9/22; A47L 9/322; A47L 9/2884
See application file for complete search history.

(56) References Cited

U.S. PATENT DOCUMENTS

| | | | |
|---|---|---|---|
| 2015/0143657 A1* | 5/2015 | Gindele | A47L 9/322 15/330 |
| 2016/0157686 A1* | 6/2016 | Bermudez | A01G 20/47 15/330 |
| 2016/0169249 A1* | 6/2016 | Takahashi | F04D 25/0673 417/423.14 |
| 2016/0195097 A1* | 7/2016 | Patrick | F04D 29/5806 415/124.2 |
| 2016/0208822 A1* | 7/2016 | Barth | E01H 1/0809 |
| 2016/0324380 A1 | 11/2016 | Sergyeyenko et al. | |
| 2017/0021489 A1* | 1/2017 | Bylund | F04D 19/002 |
| 2017/0260985 A1* | 9/2017 | Gao | F04D 25/084 |
| 2017/0325642 A1* | 11/2017 | Gao | A47L 5/14 |

OTHER PUBLICATIONS

International Preliminary Report on Patentability for International Application No. PCT/CN2017/114873 dated Jun. 9, 2020.

* cited by examiner

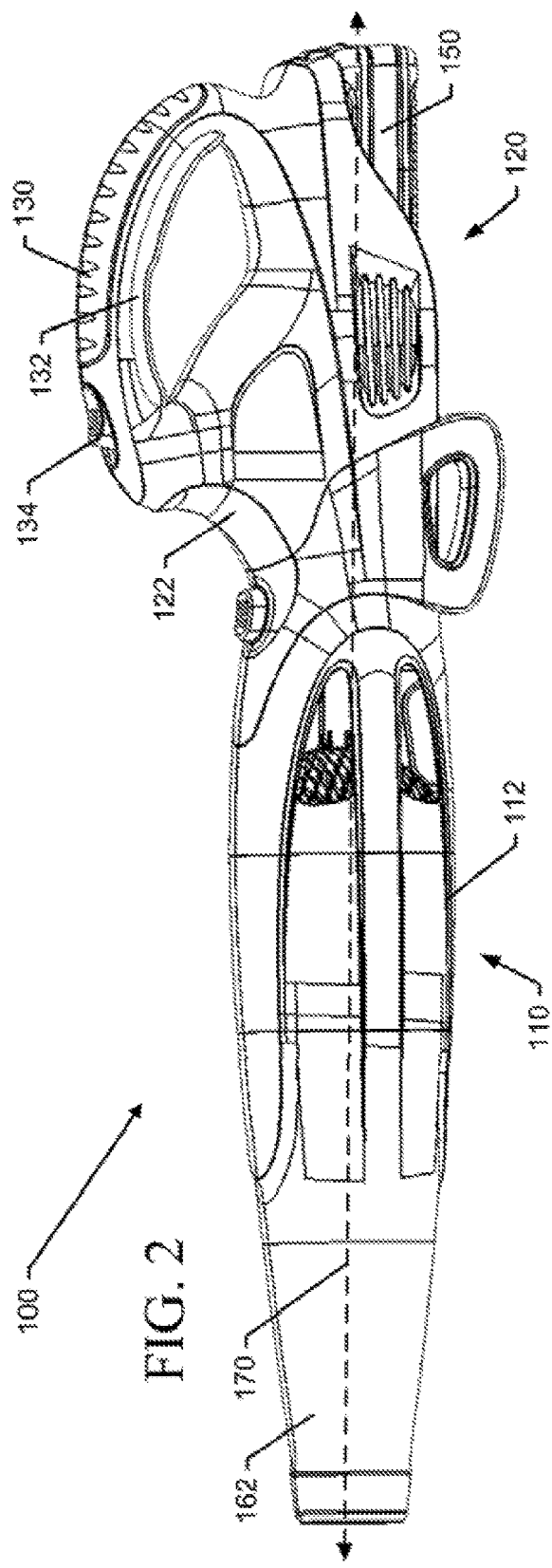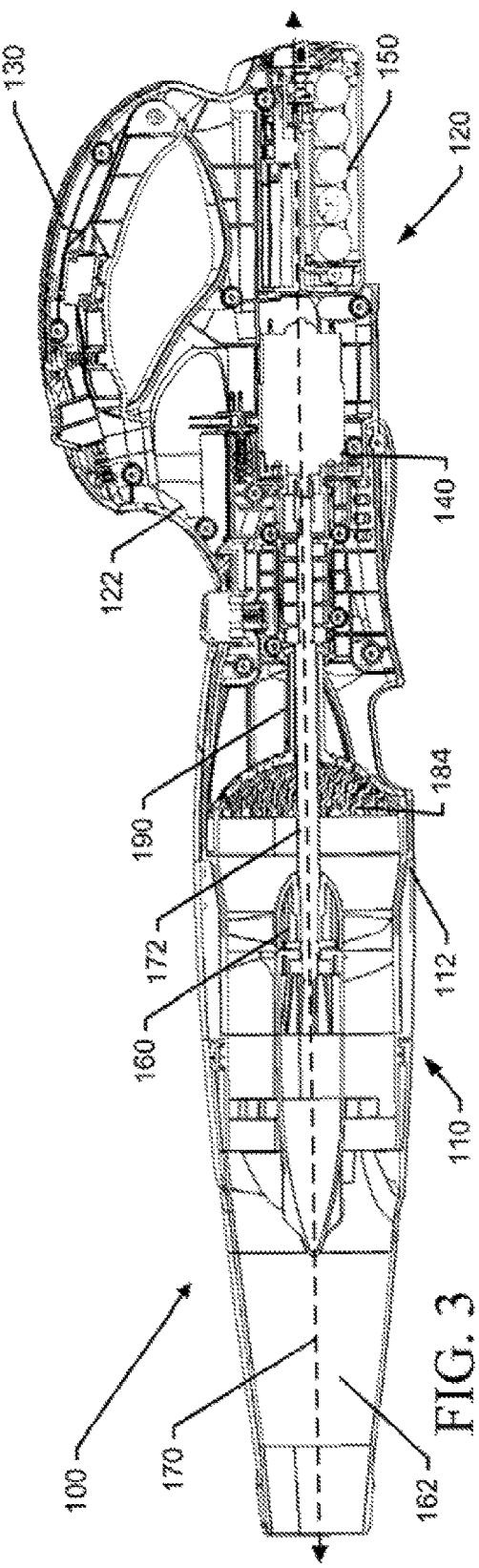

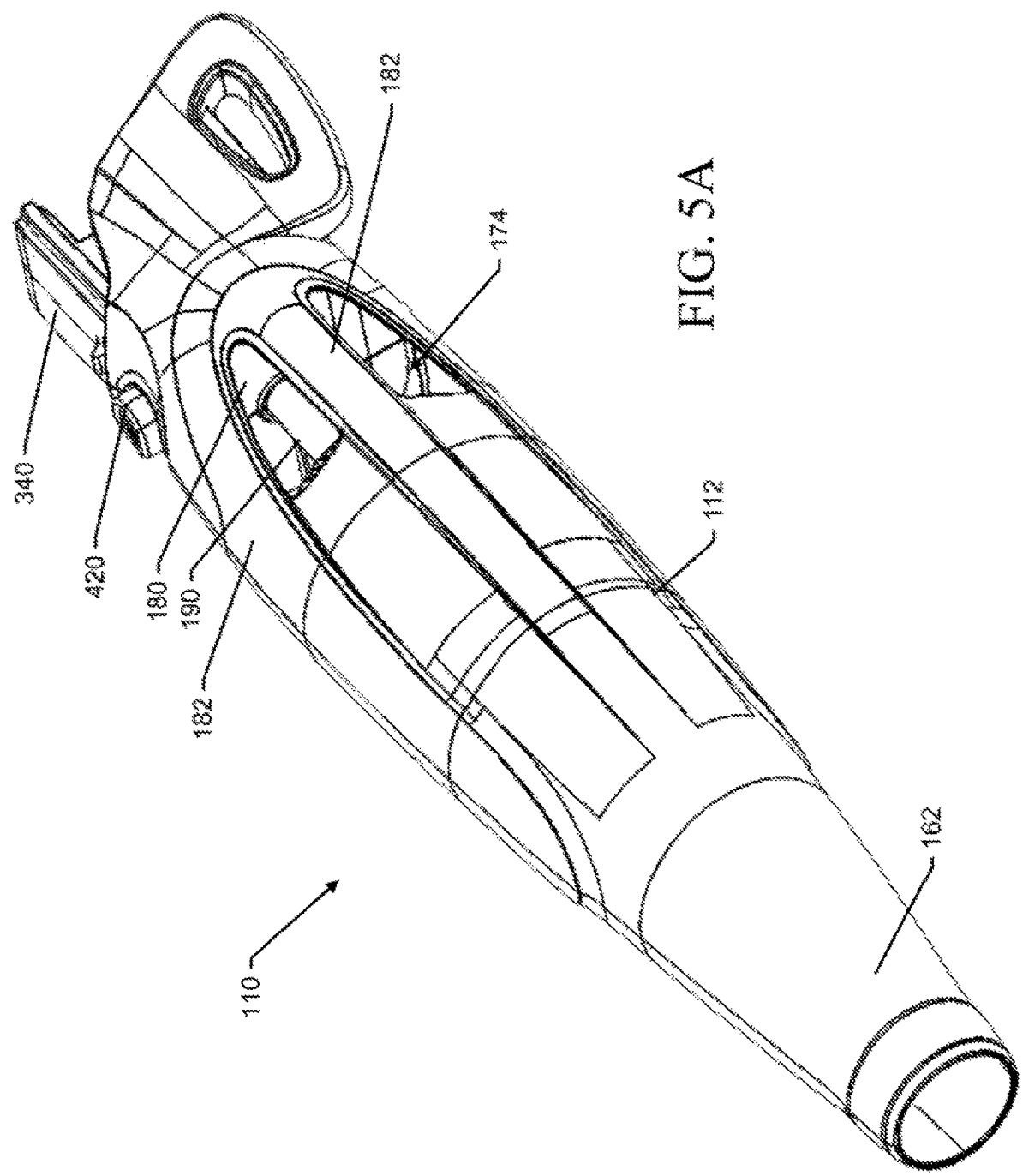

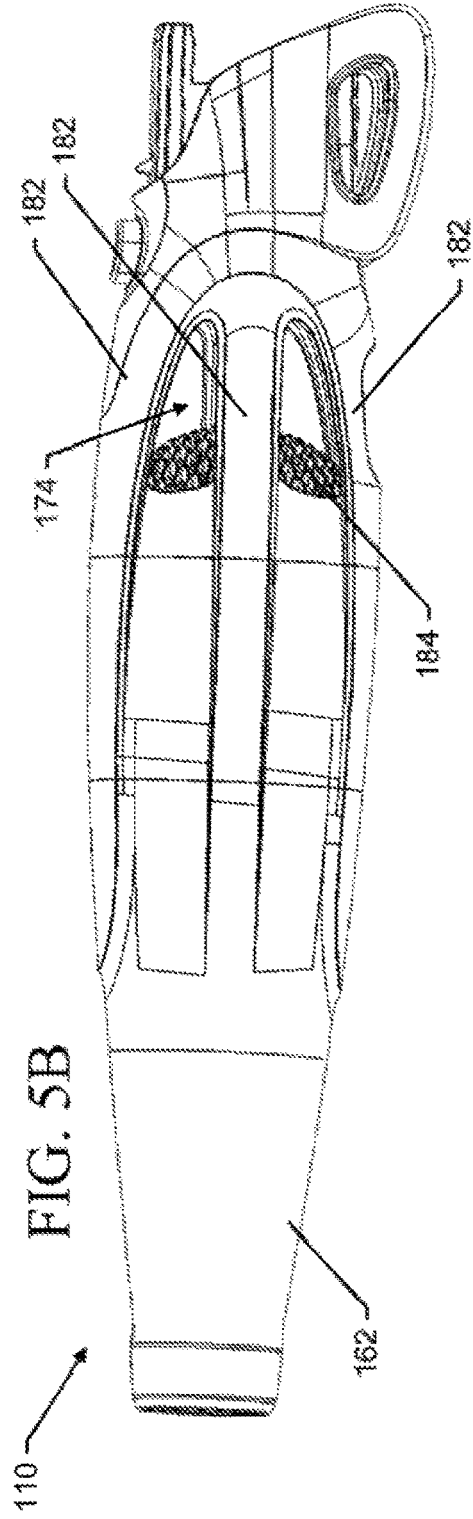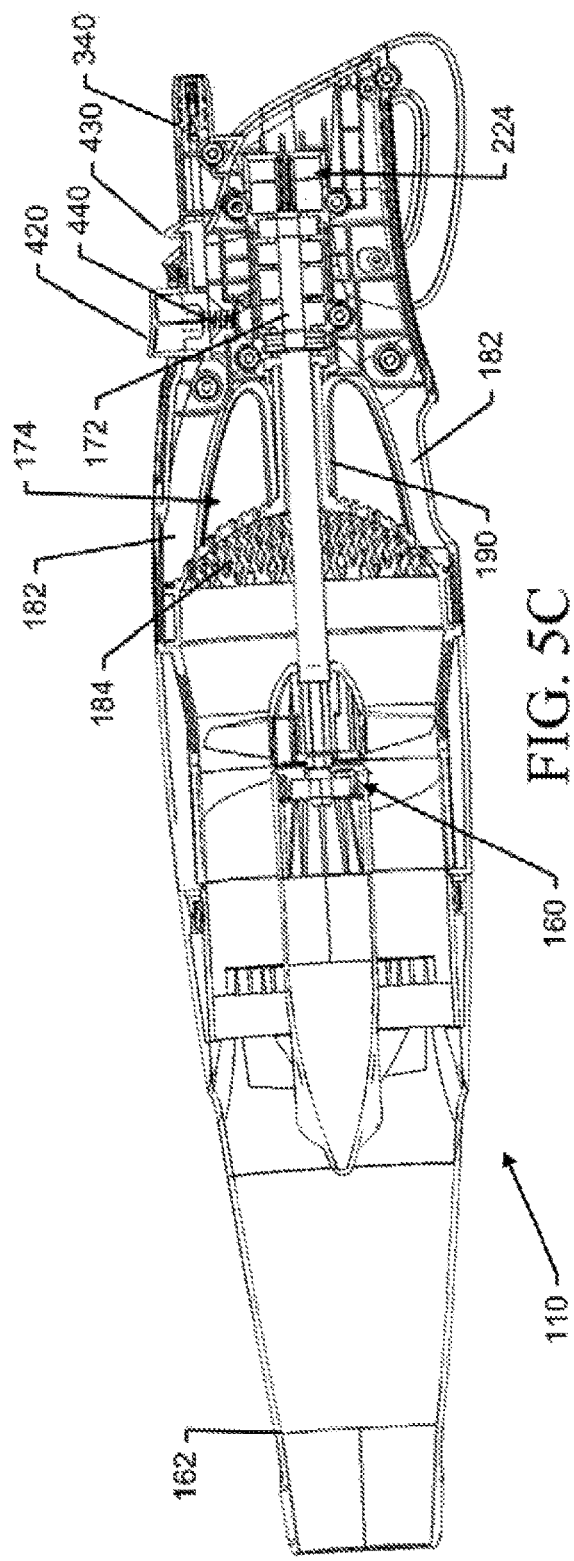

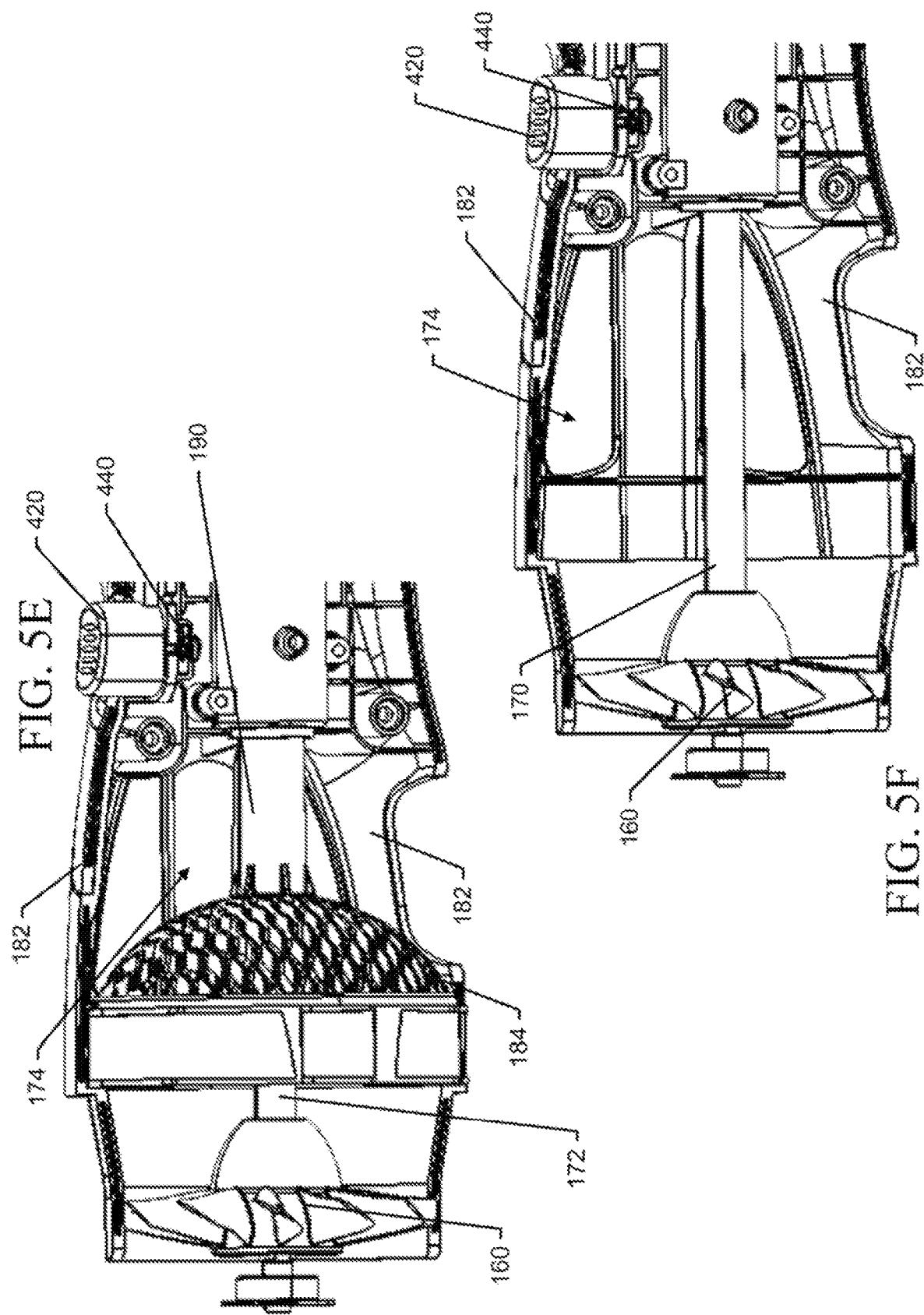

BLOWER WITH IMPROVED BALANCE AND CONSTRUCTION

TECHNICAL FIELD

Example embodiments generally relate to outdoor power equipment and, more particularly, relate to a structure for providing improved balance, compactness, and usability for a blower.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be handheld, size and weight become important considerations. In some applications, the emissions (i.e., in terms of noise and/or pollutants) generated by the device may also become an important consideration. To reduce emissions, such outdoor power equipment may be selected for employment with electric motors that could employ battery or mains power supplies.

Particularly when battery power supplies are used, mobility and usability can often be dramatically enhanced. However, for a common battery construction, where the fan and motor are located near each other, a relatively heavy battery may be required to provide proper balance for the blower. As such, the weight of the overall device may become significant enough that only robust users may be able to handle the device for an extended length of time. To lighten the weight of the device, and open up usage of the device to a wider range of operators, some significant design changes may be desirable.

BRIEF SUMMARY OF SOME EXAMPLES

Some example embodiments may therefore provide structures that facilitate a reduction in the weight of the blower, and still do so while providing a good balance to the device. Users of all ages and sizes may therefore be able to carry and direct the blower for longer periods of time.

In accordance with an example embodiment, a blower may be provided. The blower may include a blower attachment portion, a power head portion, a motor, a fan, a battery and an intake chamber. The blower attachment portion may include a blower attachment housing. The power head portion may include a power head housing that further includes a handle operably coupled thereto. The motor may be disposed in the power head housing. The fan may be disposed in the blower attachment housing. The fan may be operably coupled to the motor via a shaft to force air through a blower tube responsive to operation of the motor. The battery may be configured to be operably coupled to the motor to selectively power the motor. The intake chamber may be disposed between the motor and the fan to enable the air that is forced through the blower tube to enter the blower between the motor and the fan.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 illustrates a side perspective view of the blower in accordance with an example embodiment;

FIG. 3 illustrates a cross section view of the blower in accordance with an example embodiment;

FIG. 5A illustrates a front perspective view of the blower attachment portion in isolation in accordance with an example embodiment;

FIG. 5B illustrates a side perspective view of the blower attachment portion in isolation in accordance with an example embodiment;

FIG. 5C illustrates a cross section view of the blower attachment portion in isolation in accordance with an example embodiment;

FIG. 5E illustrates a cross section view into the intake chamber in accordance with an example embodiment;

FIG. 5F illustrates the same view as FIG. 5E except that the intake screen and shaft housing are removed to better illustrates components in the region of the intake chamber in accordance with an example embodiment;

DETAILED DESCRIPTION

Figure 1:
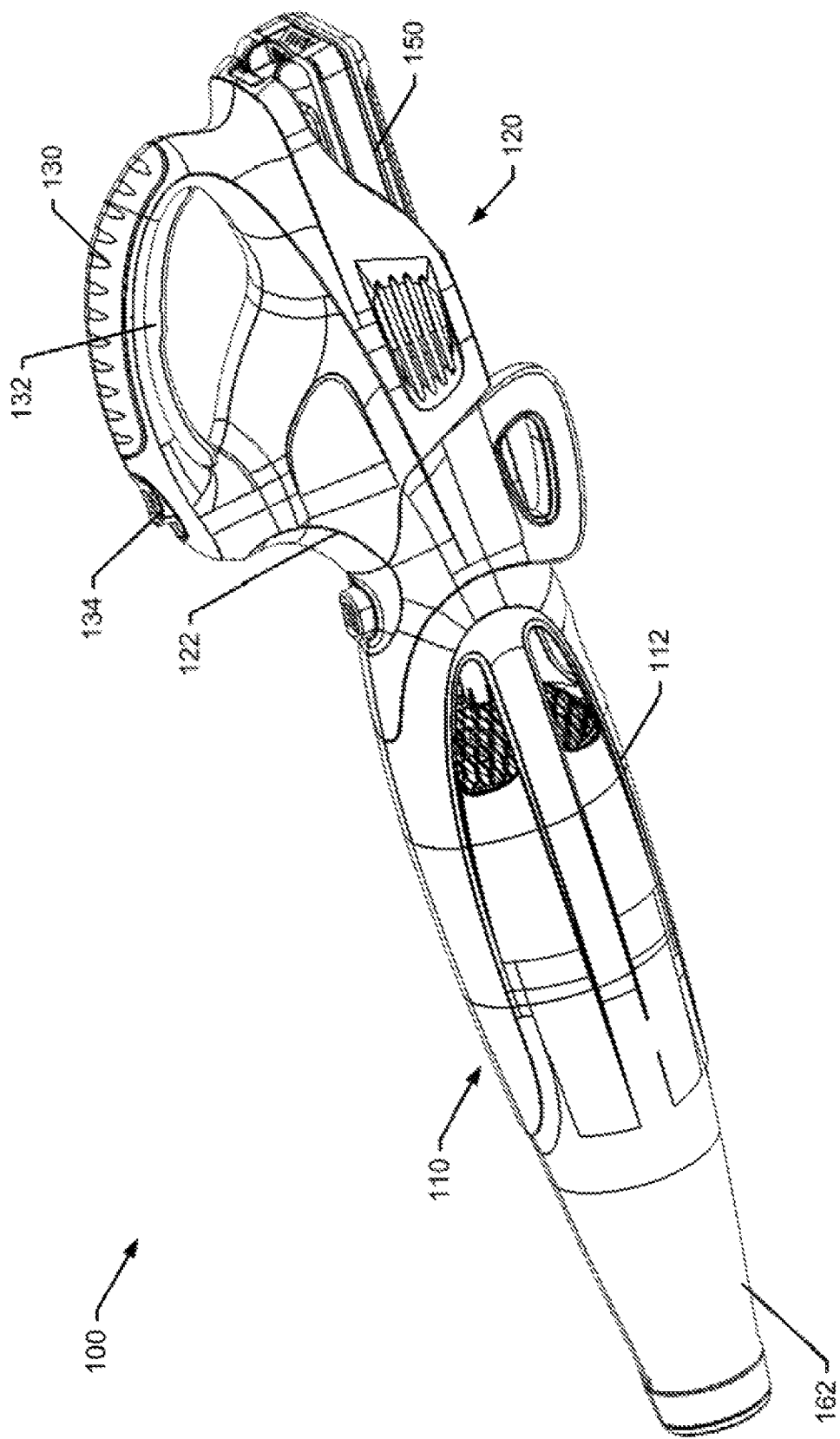
FIG. 1 illustrates a perspective view of a blower from the rear and left of the blower in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As mentioned above, a typical blower tends to collocate the fan and the motor within a housing, and then the battery is disposed at a different portion of the housing to offset the weight of the fan and motor to achieve some sort of balance and improve the ergonomics of the blower. In particular, the collocation of the fan and motor forward of the handle and the location of a relatively heavy battery rearward of the handle tends to provide a reasonable place to start from for achieving balance. However, with heavy components, and particularly heavy, high voltage batteries, the size and weight of the blower may become substantial, and limit the usability of the blower to only larger or more robust operators.

To achieve a blower that is both ergonomically balanced, but also of a size and weight that is not restrictive to users, some example embodiments described herein provide structures for providing air that fundamentally alter the ordering and positioning of components of the blower. In this regard, the blower intake may be provided between the motor and the fan of the blower. Moreover, to further enhance the provision of balance and ergonomics, axes of the motor and the fan may be aligned to form a common axis (with the air intake positioned therebetween) and the battery may also be placed in such a way as to intersect the common axis of the motor and fan, and also have its own longitudinal axis extend parallel to the common axis. In some cases, the motor, the fan and the battery may all be substantially equidistant from each other along the common axis. The centers of gravity of each of the main contributors to the weight of the blower may therefore be distributed relative to the handle in such a way as to provide a relatively light, but still powerful and easy to handle blower. As such, the relative positioning of the various components described herein can, in some cases, provide significant advantages in terms of providing versatility, maneuverability, and power all in a very ergonomically advantageous and lightweight package.

Figure 4:
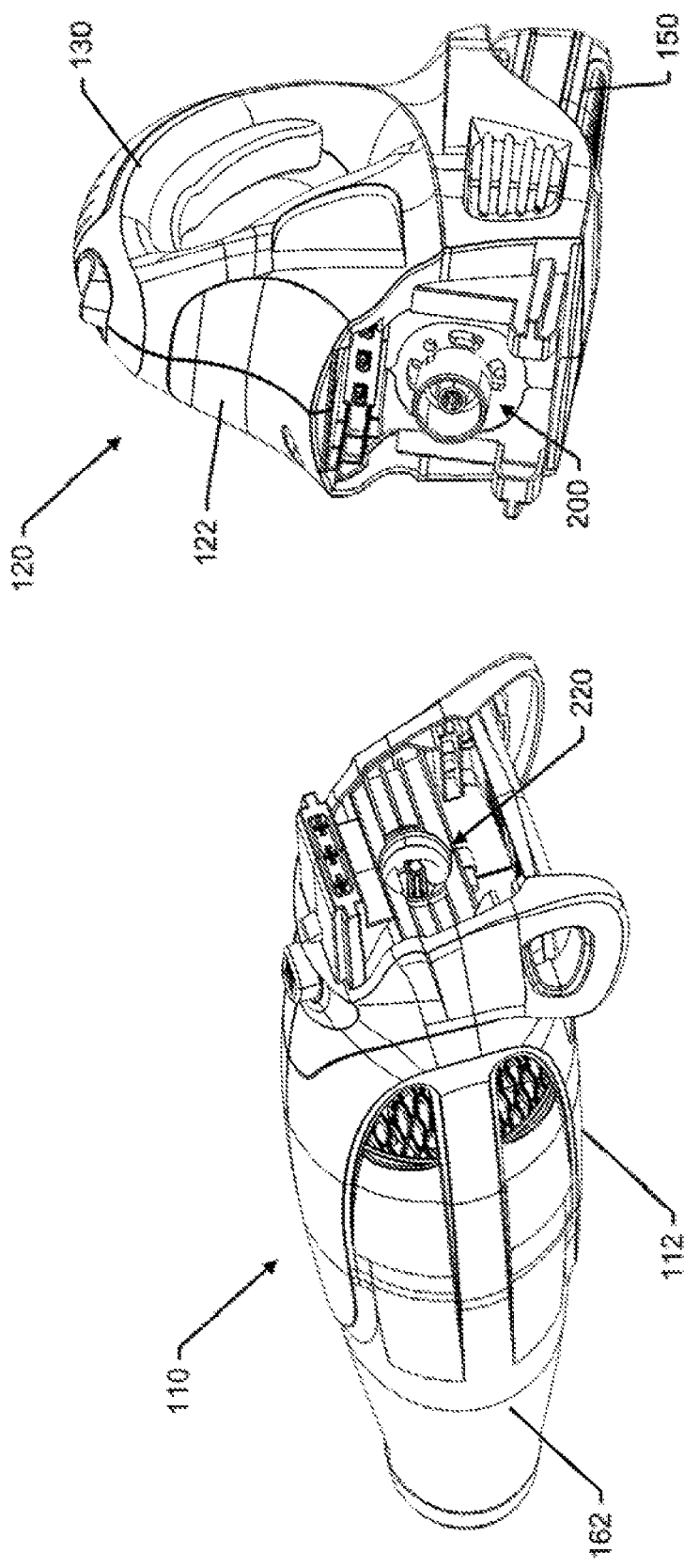
FIG. 4 illustrates a side perspective view of a blower attachment portion and a power head portion of the blower in accordance with an example embodiment.

FIG. 1 illustrates a perspective view of a blower 100 from the rear and left of the blower 100 in accordance with an example embodiment. FIG. 2 illustrates a side perspective view of the blower 100 in accordance with an example embodiment. FIG. 3 illustrates a cross section view of the blower 100 in accordance with an example embodiment. FIG. 4 illustrates a side perspective view of a blower attachment portion 110 and a power head portion 120 of the blower 100 in accordance with an example embodiment. It should be appreciated that the blower 100 of FIGS. 1-4 merely represents one example form factor for a device on which an example embodiment may be employed. Thus, other aesthetic appearances may be provided, and certain changes in form may be provided relative to the example of FIGS. 1-4 while still remaining inside the scope of example embodiments. For example, although FIG. 4 illustrates a blower attachment portion 110 and power head portion 120 that are separable from each other, some example embodiments may be formed to be inseparable from each other (e.g., with a single, common housing).

Referring to FIGS. 1-4, the blower 100 may include a housing inside which various components of the blower 100 are housed. However, given that the example shown is made from two separable pieces, it should be appreciated that the housing may also be formed of two pieces that fit together to form the housing when joined. As such, for example, the blower attachment portion 110 may include a blower attachment housing 112, and the power head portion 120 may include a power head housing 122. A handle 130 of the blower 100 may be formed integrally into the power head housing 122 at a top portion of the power head housing 122 (with "top" and all other directions being referenced to the orientation of the blower 100 to the ground and the normal way the blower 100 is held by a user during operation).

The blower 100 may further include a motor 140 or power unit for providing the driving force to move air through the blower 100. In some embodiments, the power unit may be a three phase electric motor (or DC motor) that is operated under the control of a control unit or control circuitry that may be housed in the power head housing 122. The motor 140 may be powered by a battery 150 (or battery pack) that is configured to be inserted into a rear portion of the power head housing 122. The fan 160 of the blower 100 may be provided in a blower tube 162 of the blower attachment housing 112. Thus, according to this example, the fan 160 is located in a different housing portion (i.e., the blower attachment housing 112) than the housing portion (i.e., the power head housing 122) in which the motor 140 is housed and to which the battery 150 mates.

The housing (e.g., both the blower attachment housing 112 and the power head housing 122) may be formed of plastic, composite materials, metals or any other desirable materials. In an example embodiment, the blower attachment housing 112 and the power head housing 122 may each be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces. The blower attachment housing 112 and the power head housing 122 may be configured to be separable from each other and connect to each other at a mating interface. The outer shells of each of the blower attachment housing 112 and the power head housing 122 may be configured to form a nearly continuous shell when joined at the mating interface. Moreover, in some cases, other tool attachments (e.g., a hedge trimmer or line trimmer) may be configured to attach to the power head portion 120 and the power head housing 122 by being similarly configured as the blower attachment housing 112, at least at the mating interface.

In some embodiments, the control unit may be housed in its own portion of the power head housing 122 above or otherwise proximate to the location of the motor 140. The portion of the power head housing 122 in which the control unit is housed may be referred to as a control unit housing portion, and the control unit housing portion may be an integral part of a half-shell (as described above) or may be a separate housing portion that is joined to other housing portions. The control unit housing portion may be disposed proximate to a portion of the power head housing 122 near which the handle 130 of the blower 100 is provided (e.g., forward of and below the handle 130).

In an example embodiment, the handle 130 may include an operating member 132 (e.g., a trigger or presence lever) that may be operated by one or more fingers of the operator while the operator holds the handle 130. A power button 134 may also be provided to enable electrical power to be providable from the battery 150 to the motor 140 when the power button 134 is in the "on" position, and prevent any provision of power to the motor 140 when the power button 134 is in the "off" position. Actuation of the operating member 132 may cause power from the battery 150 to be selectively applied to the motor 140 to turn the motor 140 based on control provided by the control unit. In some cases, the control unit may include interlocks, protective functions or other control mechanisms that may sense various conditions of the blower 100 via sensors, switches or other mechanisms in order to selectively control the application of power to the motor 140 based on indications of user intent (e.g., via actuation of the operating member 132) and/or determinations regarding the state of the blower 100 as provided by the sensors, switches or other mechanisms.

It should be appreciated that although FIG. 1 shows an example in which the operating member 132 is used for selective powering of the motor 140, other example embodiments may employ a selector, switch, button or other such operative member in order to selectively control operation of the motor 140. Thus, for example, in some cases, the operating member 132 could instead be a presence indicator or lever that is required to be depressed for powering the motor 140 responsive to application of power from the power button 134 based on the on/off position thereof. Thus, for example, if the power button 134 is in the on position while no operator has positive control of the blower 100 (as indicated by the fact that the operating member 132 is not actuated), then the blower 100 will not operate. Speed control or other operable functions for controlling the motor 140 may be performed using an operative member of any desirable form, and the operating member 132 is just one example.

The blower tube 162 may be formed as a substantially tapering, hollow cylinder (e.g., a frustoconical tube) that is formed about a blower tube axis and extends away from the power head portion 120, forward of the fan 160. The blower tube axis may be coaxial with an axis of the fan 160, and an axis of the motor 140 to define a common axis 170. In some embodiments, a longitudinal axis of the battery 150 may also substantially align with the common axis 170. Alternatively, the longitudinal axis of the battery 150 may extend parallel to the common axis 170, but may be slightly above or below the common axis 170 when the battery 150 is inserted into and mated with the power head portion 120.

A shaft 172 may pass from the motor 140 to the fan 160 to translate rotation of the motor 140 to the fan 160. The shaft 172 may be aligned with and coaxial with the common axis 170. As can be appreciated from FIG. 3, the shaft 172 passes through an intake chamber 174 that is formed in the blower attachment housing 112. Thus, air that is to be passed through the blower 100 is drawn into the blower 100 at a location that is between the motor 140 and the fan 160. Moreover, the location at which air is drawn into the blower 100 is a partially enclosed chamber (i.e., the intake chamber 174) that is structured to mute the noise of either the motor 140 or the fan 160 to keep the blower 100 operating relatively quietly from the perspective of the operator.

Figure 5D:
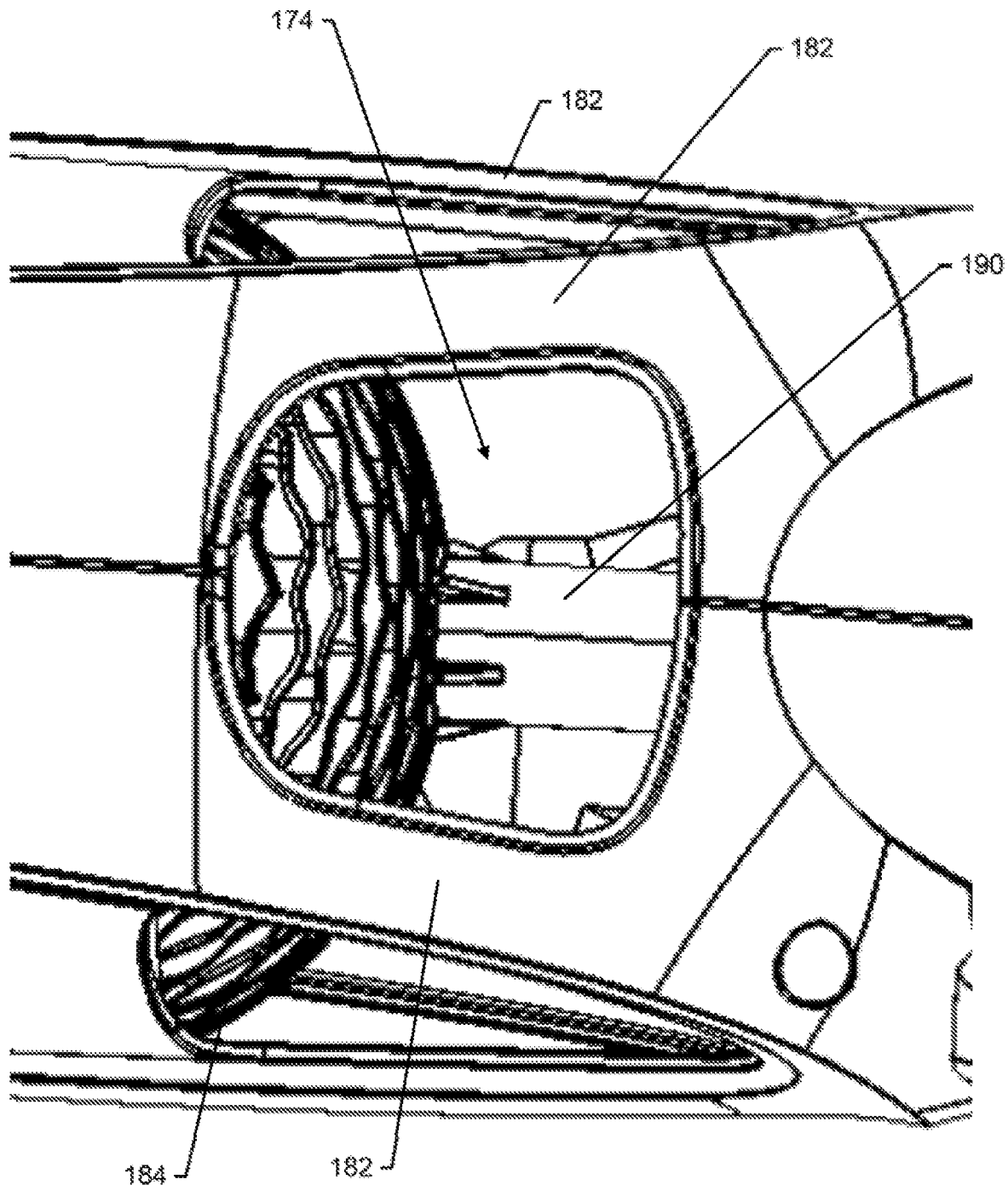
FIG. 5D illustrates an underside of the intake chamber of the blower to show how sound isolation is improved in accordance with an example embodiment.

FIG. 5, which is defined by FIGS. 5A, 5B, 5C and 5D, illustrates several views of the blower attachment portion 110 to facilitate further discussion of the intake chamber 174. In this regard, the intake chamber 174 includes rear wall 180 that is disposed at a rear end of the intake chamber 174 and sidewall members 182 that extend forward from the rear wall 180 to define the sides of the intake chamber 174. An intake screen 184 is disposed opposite the rear wall 180 and defines a front boundary of the intake chamber 174. The intake screen 184 of this example curves backward toward the rear wall 180 forming a spherical cap or dome shaped screen through which air is allowed to pass as the air travels from the intake chamber 174 into the chamber in which the fan 160 is located within the blower tube 162. Louvers or other air inlets are formed between the sidewall members 182 to enable air to be drawn therethrough into the intake chamber 174.

At least one of the sidewall members 182 may be substantially wider than others, and may be disposed at a top portion of the intake chamber 174. This particular top one of the sidewall members 182 deflects sound downward toward one of the louvers or air inlets that is also larger than others, and is disposed opposite the top one of the sidewall members 182. This structure deflects sound downward and away from the operator. Meanwhile, the sidewall members 182 also provide additional support for the structure of the blower attachment portion 110 to prevent bending of the shaft 172 and enable, for a two piece and separable construction, a robust interface to be defined between the blower attachment portion 110 and the power head portion 120.

The blower tube 162 may include an inlet portion disposed proximate to the fan 160 and an outlet. The outlet may be at a distal end of the blower tube 162, opposite the inlet portion. Given that the operator typically holds the blower 100 by the handle 140 and the remainder of the blower 100 is suspended below the handle 130 with the outlet aimed in front of the operator, the handle 130 is generally considered to be at a top portion of the blower 100 and the outlet is at the front, while the battery 150 is considered to be at a rear of the blower 100. As mentioned above, the blower tube 162 may taper slightly (i.e., have a decreasing diameter) as the blower tube 162 extends toward the outlet. Thus, a largest diameter of the blower tube 162 may be provided at the point of the blower tube 162 that is closest to the fan 160.

In an example embodiment, the operation of the motor 140 may cause an impeller of the fan 160 to rotate (via the shaft 172) so that a low pressure area is generated to draw air into the intake chamber 174, through the intake screen 184, and to the fan 160 to be expelled from the blower tube 162 at the outlet to blow leaves, debris, or any other material. As mentioned above and as shown in FIG. 3, the motor 140, the shaft 172 and the fan 160 may each be coaxial with the blower tube and the common axis 170, so that air exiting the fan 160 is generally moved (although such flow may be turbulent) along a direction substantially parallel to the common axis 170. Air entering the intake chamber 174 may be generally drawn therein in a direction substantially perpendicular to the common axis 170, and then passed through the intake screen 184 to enter the blower tube 162 before being expelled. Given that the intake chamber 174 and the intake screen 184 are inset within the blower attachment housing 112, flow noise generated by airflow over the intake screen 184 may therefore be muted inside the blower attachment housing 112 or directed out the downward and side facing louvers. Thus, any noise emanating from the intake chamber 174 may be directed at an angle relative to the common axis 170. More specifically, any such noise may be directed downward (i.e., toward the ground) and/or sideways away from the operator's ears.

In an example embodiment, the shaft 172 may pass through the intake chamber 174 through an enclosed shaft housing 190. Thus, the shaft housing 190 may extend from the rear wall 180 to the intake screen 184, and may also be coaxial with the shaft 172 and the common axis 170. The shaft housing 190 may prevent debris from building up on the shaft 172, and from getting into the motor 140 via the opening through the rear wall 180 that permits the shaft 172 to pass therethrough to access the motor 140. The shaft housing 190 may also contribute to the structural rigidity of the blower attachment portion 110 to prevent bending of the shaft 172 and enable, for a two piece and separable construction, a robust interface to be defined between the blower attachment portion 110 and the power head portion 120. Such interface will now be described primarily in reference to FIGS. 4, 5A, 5B, 5C and 6, which is defined by FIGS. 6A, 6B, 6C, 6D and 6E.

Figure 6A:
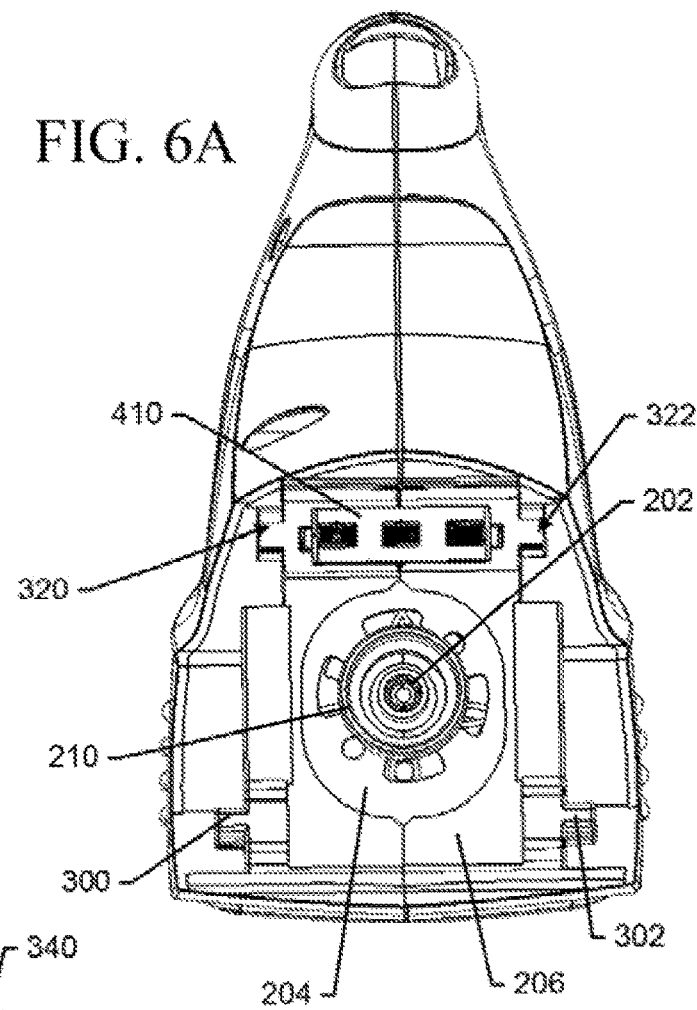
FIG. 6A is a front view of the power head portion in isolation in accordance with an example embodiment.
Figure 6B:
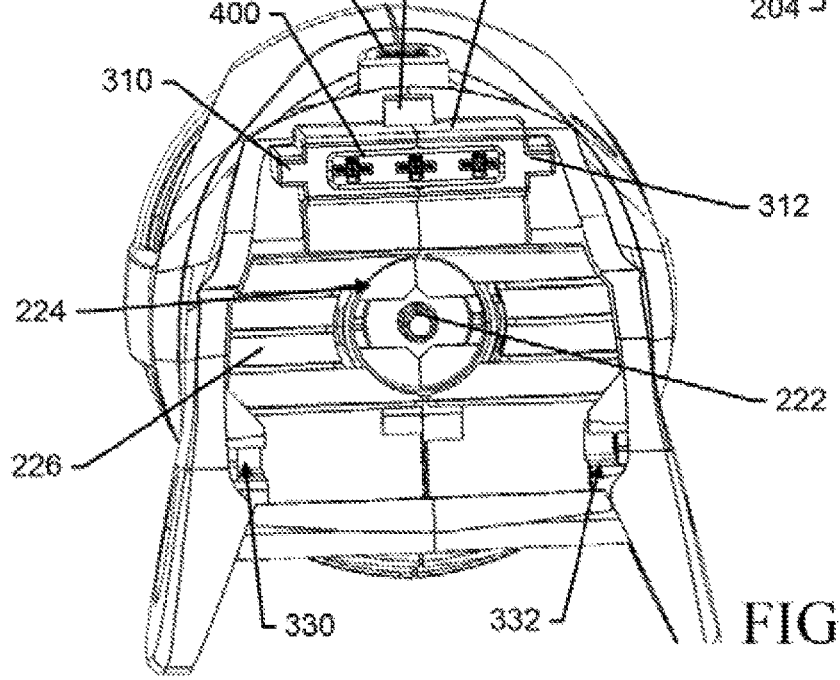
FIG. 6B illustrates a rear view of the blower attachment portion in isolation in accordance with an example embodiment.
Figure 6C:
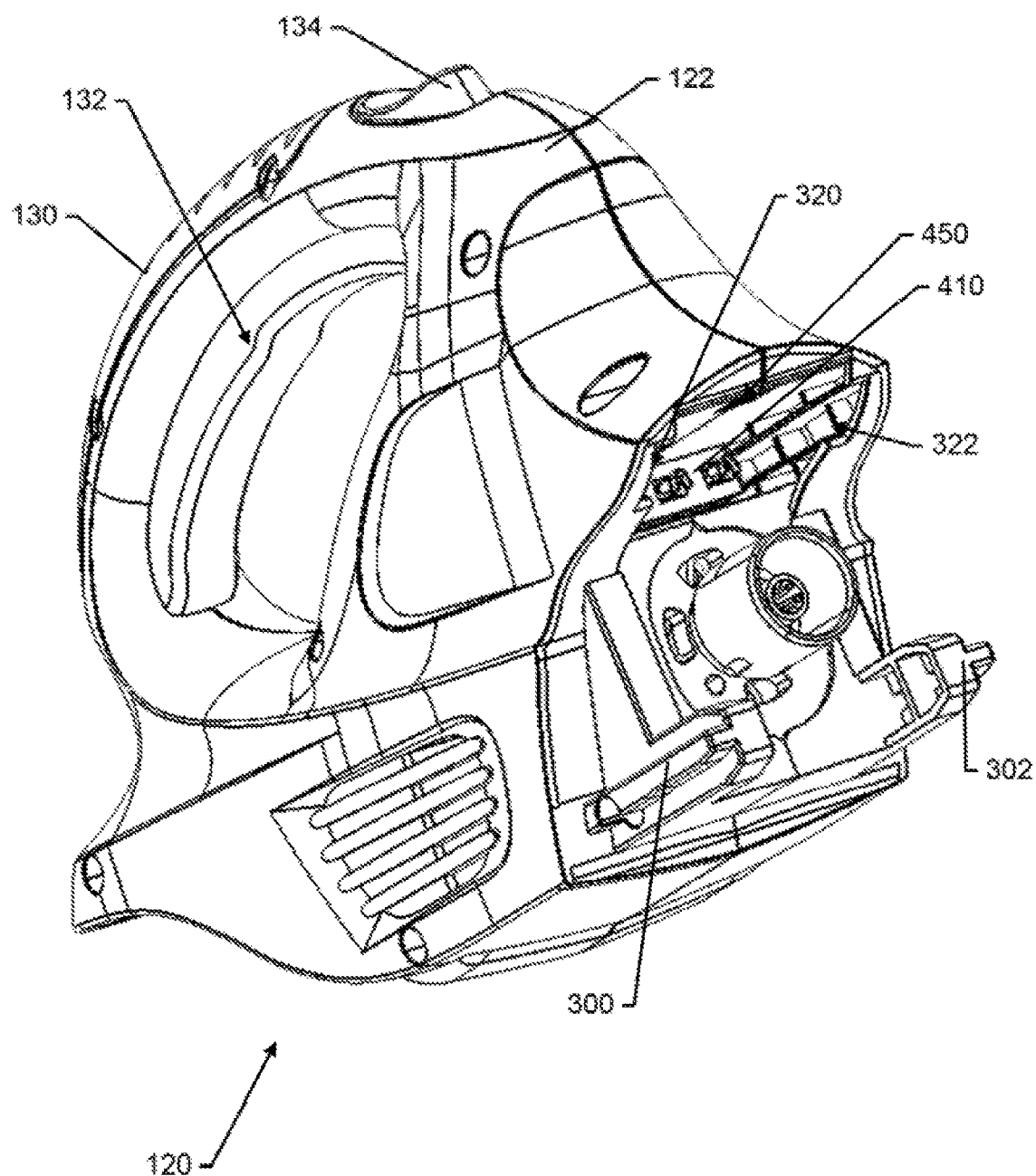
FIG. 6C illustrates a perspective view of the power head portion in isolation in accordance with an example embodiment.
Figure 6D:
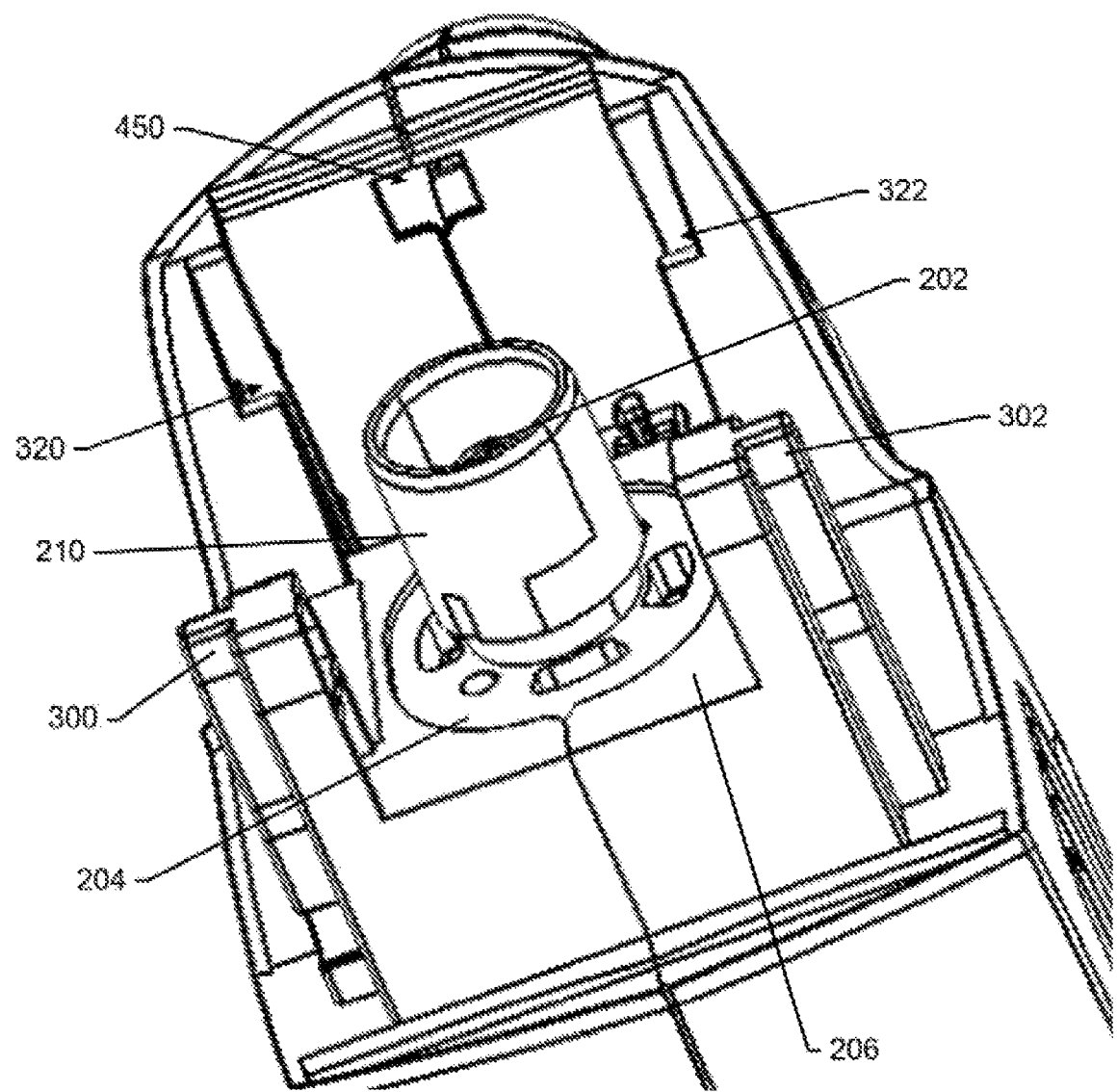
FIG. 6D illustrates an upward looking perspective view into the mating interface of the power head portion in accordance with an example embodiment.
Figure 6E:
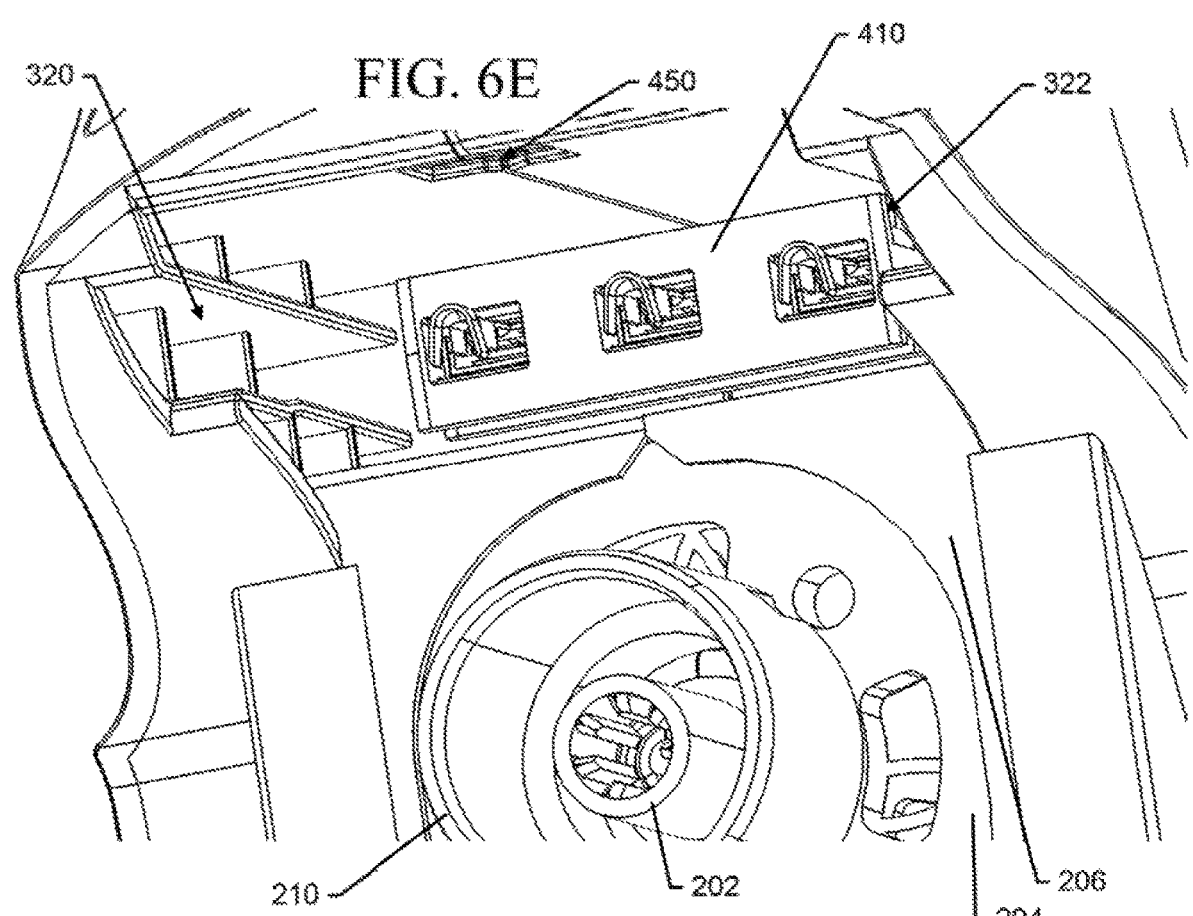
FIG. 6E is a close in, perspective view of the mating interface of the power head portion in accordance with an example embodiment.
Figure 6F:
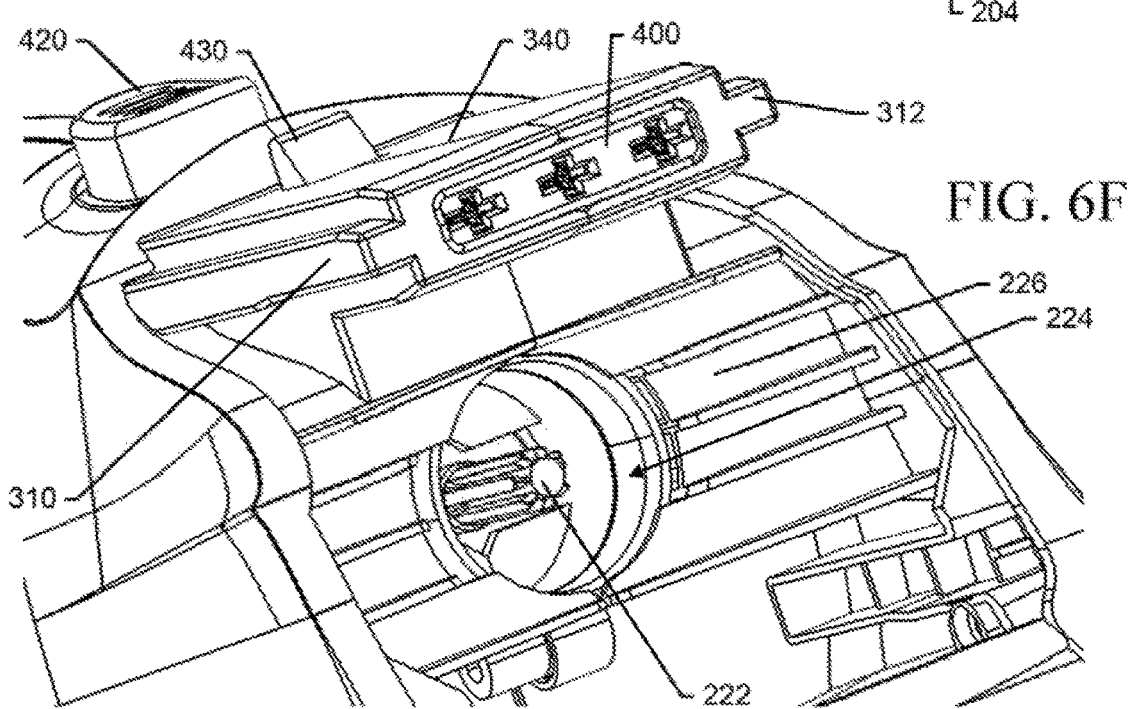
FIG. 6F is a close in, perspective view of the mating interface of the blower attachment portion in accordance with an example embodiment.

FIG. 4 illustrates perspective views of a mating interface between the blower attachment portion 110 and the power head portion 120. FIG. 6A illustrates a front view of the power head portion 120 looking along the common axis 170 into the mating interface on the power head portion 120 side. FIG. 6B illustrates a rear view of the blower attachment portion 110 looking along the common axis 170 into the mating interface on the blower attachment portion 110 side. FIG. 6C is a right side perspective view of the mating interface of the power head portion 120, and FIG. 6D is a perspective view from the bottom looking into the mating interface of the power head portion 120. FIG. 6E is a close in, perspective view of the mating interface of the power head portion 120, and FIG. 6F is a close in, perspective view of the mating interface of the blower attachment portion 110.

Referring now to FIGS. 4, 5A, 5B, 5C and 6, the mating interface between the blower attachment portion 110 and the power head portion 120 includes three main interface portions that each include components associated with respective ones of the blower attachment portion 110 and the power head portion 120. In this regard, the mating interface includes a drive power transfer assembly, an electronic assembly, and a physical mating assembly. The drive power transfer assembly, the electronic assembly, and the physical mating assembly may each include components that are split between the blower attachment portion 110 and the power head portion 120, where the components only engage each other to render the blower 100 operable when the mating interface is engaged.

The drive power transfer assembly is defined by a drive provider portion 200 disposed at the power head portion 120 and a drive receiver portion 220 disposed at the blower attachment portion 110. The drive provider portion 200 includes a driving portion 202 of the shaft 172. The driving portion 202 may be operably coupled to a portion of the shaft 172 that extends from the motor 140 and may protrude from an interface plate 204 that may be embedded or otherwise provided in a front wall 206 that is part of the power head housing 122 that is disposed forward of the motor 140. The interface plate 204 may include one or more holes or orifices provided therein to allow air to pass to or from a space defined between the power head portion 120 and the blower attachment portion 110 when the mating interface is engaged to a space inside the power head housing 122 where the motor 140 is housed. The power head housing 122 may also include louvers on opposing right and left sides thereof (proximate to the motor 140), and the blower attachment housing 112 may include louvers at a bottom portion thereof, proximate to the mating interface, in order to allow cooling air to flow between the blower attachment housing 112 and the power unit housing 122 for cooling of the motor 140.

The drive provider portion 200 may also include a guide sleeve 210 that extends coaxial with the driving portion 202 (and coaxial with the common axis 170). The guide sleeve 210 may be a hollow cylinder that extends away from the interface plate 204 and has a length and diameter that are each longer than the length and diameter of the driving portion 202.

The drive receiver portion 220 may include a driven portion 222 of the shaft 172 that is configured to be operably coupled to the driving portion 202 when the mating interface is engaged. The driven portion 222 may extend rearward from an end of the shaft 172 that extends away from the fan 160. The driven portion 222 may be disposed within a guide receiver 224 formed in a rear mating surface 226 of the blower attachment housing 112. The guide receiver 224 may be a cylindrically shaped depression formed in the rear mating surface 226. In an example embodiment, the depth of the guide receiver 224 from the rear mating surface 226 may be substantially equal to the length of the guide sleeve 210. Additionally, in some cases, the length of the driven portion 222 may be substantially equal to the depth of the guide receiver 224 (and the length of the guide sleeve 210). Moreover, the depth and shape of the guide receiver 224 may substantially match the length and shape of the guide sleeve 210. However, the guide sleeve 210 may have an outside diameter that is slightly less than an inside diameter of the guide receiver 224.

The complementary shapes of the guide receiver 224 and guide sleeve 210 enable the guide sleeve 210 to be inserted into the guide receiver 224 to guide the mating of the driving portion 202 with the driven portion 222 of the shaft 172 when the mating interface is engaged. The shaft 172 may then (i.e., when the driving portion 202 and the driven portion 222 are engaged) pass unbroken from the fan 160 through the intake screen 184 into the intake chamber 174 (albeit within the shaft housing 190) and through the rear wall 180 of the intake chamber 174. From that point, the shaft 172 may pass through the rear mating surface 226 and into the guide receiver 224 and guide sleeve 210 (which will be coaxial with the guide sleeve 210 inserted into the guide receiver 224), where the driven portion 222 and driving portion 202 actually engage each other. The shaft 172 then continues through the interface plate 204 to the motor 140. In an example embodiment, the driven portion 222 may include longitudinally extending grooves formed in the outer surface of the cylindrical structure that forms the driven portion 222. The driving portion 202 may be a substantially hollow cylinder (or at least terminate as such). In some embodiments, the interior of the driving portion 202 may include longitudinally extending protrusions or teeth that engage corresponding ones of the grooves formed in the driven portion 222. The positions of the grooves and protrusions could, of course, be reversed in some example embodiments.

When the motor 140 operates (e.g., under the control of the control unit), the motor 140 turns the shaft 172, which turns the fan 160 to draw air into the intake chamber 174 and expel the air from the blower tube 162. The drive power transfer assembly is configured to enable the drive provider portion 200 disposed at the power head portion 120 to be mated with the drive receiver portion 220 disposed at the blower attachment portion 110 when the mating interface is engaged to provide mechanical (in this case rotary) power from one separable component (i.e., the power head portion 120) to another separable component (i.e., the blower attachment portion 110). In this regard, the drive power transfer assembly is configured to operably couple two portions of a split shaft to combine such portions into a working shaft (i.e., shaft 174) that extends through the intake chamber 174 to provide a blower structure that places the air intake between the motor 140 and the fan 160. However, the drive power transfer assembly is configured to ensure the proper alignment of the two portions of the split shaft by ensuring that the guide sleeve 210 inserts into the guide receiver 224 before the driving portion 202 of the shaft 174 engages the driven portion 222 of the shaft 174. Thus, the teeth and/or grooves on the driven portion 222 and the driving portion 202 can be less susceptible to damage, and the driven portion 222 and driving portion 202 can also avoid damage (e.g., due to bending or deformation) that might occur if mating attempts were made without proper alignment.

The physical mating assembly may provide further structures for ensuring proper alignment of the power head portion 120 and the blower attachment portion 110 for engagement of the mating interface. Moreover, the physical mating assembly may also provide the structures that enable the mating interface to transition between an engaged state (holding the power head portion 120 and the blower attachment portion 110 together to operably couple them in a manner that allows the blower 100 to be operable), and a disengaged state (where the power head portion 120 and blower attachment portion 110 can be separated from each other).

In an example embodiment, the physical mating assembly may be primarily comprised of an alignment and support assembly, and an engagement assembly. The alignment and support assembly may (similar to the guide sleeve 210 and the guide receiver 224) ensure that certain other structures of the electronic assembly and/or the drive power transfer assembly are properly aligned before engagement thereof. The alignment and support assembly may also ensure that the power head portion 120 and the blower attachment portion 110 are rigidly and securely mated to each other so that when the engagement assembly engages the power head portion 120 and the blower attachment portion 110 to each other the blower 100 is operable as one structurally stable platform. Meanwhile, the engagement assembly locks the power head portion 120 and the blower attachment portion 110 together when in the engaged state.

The alignment and support assembly includes a first rail assembly (including rails 300 and 302) and a second rail assembly (including rails 310 and 312), and a corresponding first set of guide grooves (including grooves 320 and 322) and second set of guide grooves (including grooves 330 and 332), where the first rail assembly 300, 302 is configured to slidably engage the first set guide grooves 320, 322 and the second rail assembly 310, 312 is configured to slidably engage the second set of guide grooves 330, 332. The alignment and support assembly is designed so that the power head portion 120 includes one rail assembly and one set of guide grooves (e.g., the first rail assembly 300, 302 and the first set of guide grooves 320, 322), and the blower attachment portion 110 includes a complementary rail assembly and set of guide grooves (e.g., the second rail assembly 310, 312 and the second set of guide grooves 330, 332).

As can be seen in FIG. 4, for example, the first set of guide grooves 320, 322 may be disposed on the power head portion 120 above the guide sleeve 210, while the first rail assembly 300, 302 is disposed below the guide sleeve 210. Each of the grooves (320 and 322) of the first set of guide grooves 320, 322 may substantially mirror each other relative to a longitudinally extending plane dividing the power head portion 120 into substantially equal right and left halves. Similarly, each of the rails (300 and 302) of the first rail assembly 300, 302 may substantially mirror each other relative to a longitudinally extending plane dividing the power head portion 120 into substantially equal right and left halves.

The second set of guide grooves 330, 332 may be disposed on the blower attachment portion 110 below the guide receiver 224, while the second rail assembly 310, 312 is disposed above the guide receiver 224. Each of the grooves (330 and 332) of the second set of guide grooves 330, 332 may substantially mirror each other relative to a longitudinally extending plane dividing the blower attachment portion 110 into substantially equal right and left halves. Similarly, each of the rails (310 and 312) of the second rail assembly 310, 312 may substantially mirror each other relative to a longitudinally extending plane dividing the blower attachment portion 110 into substantially equal right and left halves. Moreover, the first set of guide grooves 320, 322 may be configured to engage respective ones of the second rail assembly 310, 312, while the second set of guide grooves 330, 332 are configured to engage respective ones of the first rail assembly 300, 302.

The first rail assembly 300, 302 includes individual rails (300 and 302) that are not connected to each other in this example. Thus, the rails (300 and 302) of the first rail assembly 300, 302 are separated and spaced apart from each other. The rails (300 and 302) of the first rail assembly 300, 302 extend substantially perpendicularly away from the front wall 206 by a distance that is substantially equal to a distance that the grooves (320 and 322) of the first set of guide grooves 320, 322 extend into the power head portion 120 to reach the front wall 206.

The second rail assembly 310, 312 includes individual rails (310 and 312) that are disposed on opposite lateral sides of a protruding member 340 that extends substantially perpendicularly away from the rear mating surface 226 and is substantially parallel to the common axis 170. Thus, the rails (310 and 312) of the second rail assembly 310, 312 are spaced apart from each other by the protruding member 340, but operably coupled to each other via the protruding member 340. The rails (310 and 312) of the second rail assembly 310, 312 also extend substantially perpendicularly away from the rear mating surface 226 by a distance that is substantially equal to a distance that the grooves (330 and 332) of the second set of guide grooves 330, 332 extend into the blower attachment portion 110 past the rear mating surface 226. In an example embodiment, the rails (310 and 312) of the second rail assembly 310, 312 may be substantially equal in length to the grooves (330 and 332) of the second set of guide grooves 330, 332. However, both the rails (310 and 312) of the second rail assembly 310, 312 and the grooves (330 and 332) of the second set of guide grooves 330 may extend beyond the rear mating surface 226 in both directions perpendicular thereto. In some cases, the rails (310 and 312) of the second rail assembly 310, 312 may be substantially equal in length to the grooves (330 and 332) of the second set of guide grooves 330, 332 may extend past the rear mating surface 226 in the forward direction by a distance substantially equal to a depth of the guide receiver 224.

The first rail assembly 300, 302 and the second rail assembly 310, 312 may each have a substantially T shape, where a base of the T shape is oriented to extend outward relative to the longitudinally extending planes dividing the blower attachment portion 110 and power head portion 120 into substantially equal right and left halves. The first set of guide grooves 320, 322 and the second set of guide grooves 330, 332 may be shaped as grooves that are oriented to receive the base of the T of respective ones of the first rail assembly 300, 302 and the second rail assembly 310, 312. A distance between the rails (300 and 302) of the first rail assembly 300, 302 may be slightly less than (but substantially equal to) a distance between the grooves (320 and 322) of the first set of guide grooves 320, 322. Similarly, a distance between the rails (310 and 312) of the second rail assembly 310, 312 may be slightly less than (but substantially equal to) a distance between the grooves (330 and 332)

of the second set of guide grooves 330, 332. However, the distance between the rails (310 and 312) of the second rail assembly 310, 312 may be less than the distance between the rails (300 and 302) of the first rail assembly 300, 302. The different distances (i.e., widths) may ensure that the operator will not attempt to engage the blower attachment portion 110 to the power head portion 120 upside down or in any orientation other than the proper orientation.

During engagement, the first rail assembly 300, 302 may engage the second set of guide grooves 330, 332 at approximately the same time that the second rail assembly 310, 312 engages the first set of guide grooves 320, 322. In any case, sliding engagement between these components will be prevented or at least very limited until both sets of rails and grooves are properly aligned. This nearly simultaneous engagement (or at least nearly simultaneous sliding engagement) ensures proper alignment of components of the drive power transfer assembly and the electronic assembly to avoid damaging or breaking such components. In an example embodiment, the first rail assembly 300, 302 must slidably engage the second set of guide grooves 330, 332 for at least some distance while the second rail assembly 310, 312 also slidably engages the first set of guide grooves 320, 322 for a similar distance before the guide sleeve 210 begins to be inserted into the guide receiver 224. This sliding engagement must then continue for at least a given distance before the driven portion 222 and the driving portion 202 of the shaft 174 engage each other. Thus, example embodiments provide for the sliding engagement of components the physical mating assembly before any engagement of components of the drive power transfer assembly and the electronic assembly. Moreover, example embodiments define an ordered sequence to the engagement of specific components to limit the potential for damaging components.

The engagement assembly may be configured to lock the blower attachment portion 110 to the power head portion 120 when in the engaged state. In an example embodiment, the engagement assembly may include an operator (e.g., button 420) that is disposed on the blower attachment portion 110 and protrudes from a portion of the blower attachment housing 112 (e.g., at a top portion thereof). The button 420 may be operably coupled to a locking projection 430 that extends from a portion of the protruding member 340 to move the locking projection 430 whenever the button 420 moves. In some cases, the button 420 may be configured to be depressed against a biasing force provided by a biasing member (e.g., spring 440). Accordingly, when depressed, the button 420 may be retracted into the blower attachment housing 112 and the locking projection 430 may correspondingly be retracted into the protruding member 340. However, when the button 420 is released, the spring 440 may urge the button 420 and the locking projection 430 upward and out of the blower attachment housing 112 and protruding member 340, respectively.

Meanwhile, the power head housing 122 may include a receiving slot 450 disposed in an interior top portion thereof that corresponds to a position of the locking projection 430 when the blower attachment portion 110 is mated with the power head portion 120 via engagement of the components of the alignment and support assembly in the manner described above. Thus, for example, while the first rail assembly 300, 302 slidably engaged the second set of guide grooves 330, 332 and the second rail assembly 310, 312 also slidably engages the first set of guide grooves 320, 322 to draw the power head housing 122 closer to the blower attachment housing 112, the interior top portion of the power head housing 122 may exert a force on the locking projection 430 to overcome the spring 440 and retract the locking projection 430 into the protruding member 340 to enable continued sliding between the rail assemblies and guide grooves until the locking projection 430 aligns with the receiving slot 450. When the locking projection 430 aligns with the receiving slot 450, the spring 440 may force the locking projection 430 into the receiving slot 450 to lock the power head housing 122 to the blower attachment housing 112 in the engaged state. When separation of the power head housing 122 and the blower attachment housing 112 is desired, the operator may depress the button 420, as described above, to withdraw the locking projection 430 from the receiving slot 450 and permit the components of the alignment and support assembly described above to be slidingly moved relative to each other in a direction that separates the power head portion 120 from the blower attachment portion 110 until the components no longer engage each other and the power head portion 120 and the blower attachment portion 110 are separated from each other.

The electronic assembly may include one portion at each of the power head portion 120 and the blower attachment portion 110. In this regard, the electronic assembly may include a first contact assembly 400 disposed at the blower attachment portion 110 and a second contact assembly 410 disposed at the power head portion 120. The first and second contact assemblies 400 and 410 may be positioned such that they engage each other when the power head housing 122 and the blower attachment housing 112 are in the engaged state. One of the first contact assembly 400 or the second contact assembly 410 may include male electrical contacts, and the other may include female electrical contacts configured to receive the male electrical contacts. Which one of the first contact assembly 400 or the second contact assembly 410 includes respective ones of the male/female contact portions does not matter. However, it should be appreciated that the male and female contact portions do not engage each other until the alignment provided by the alignment and support assembly is established in the manner described above.

In the examples shown, male contacts are provided on the second contact assembly 410 on the power head portion 120. Accordingly, the male contacts are inset within the power head housing 122 and relatively protected from bending or other fouling or damage. Meanwhile the female contacts are provided on the first contact assembly 400, which is disposed on a distal end of the protruding member 340 (e.g., between distal ends of the rails (310 and 312) of the second rail assembly 310, 312. Thus, there are no bendable or breakable components on the protruding member 340.

In an example embodiment, at least some of the contacts of the first and second contact assemblies 400 and 410 may be operably coupled to the control unit of the blower 100 for the implementation of various safety features associated with operation of the blower 100. In the example shown, three contacts are provided on the first and second contact assemblies 400 and 410. Within the protruding member 340 one of the contacts of the first contact assembly 400 may be dead ended, and therefore essentially provide no function relative to operation of the blower 100 for the corresponding male contact on the second contact assembly 410. However, the other two contacts of the first contact assembly 400 may be jumpered together within the protruding member 340 to complete an electrical circuit between the corresponding two contacts of the second contact assembly 410. The completion of this electrical circuit could be used as a safety check to prevent operation of the motor 140 unless the attachment of the power head portion 120 to the blower attachment portion 110 can be confirmed (by completion of the circuit). In some embodiments, another tool (e.g., a hedge trimmer or line trimmer) can be replaced for the blower attachment portion 110, and the contact that is dead ended in this example may actually provide a function (e.g., a safety or operational function) in the corresponding other tool.

Figure 7A:
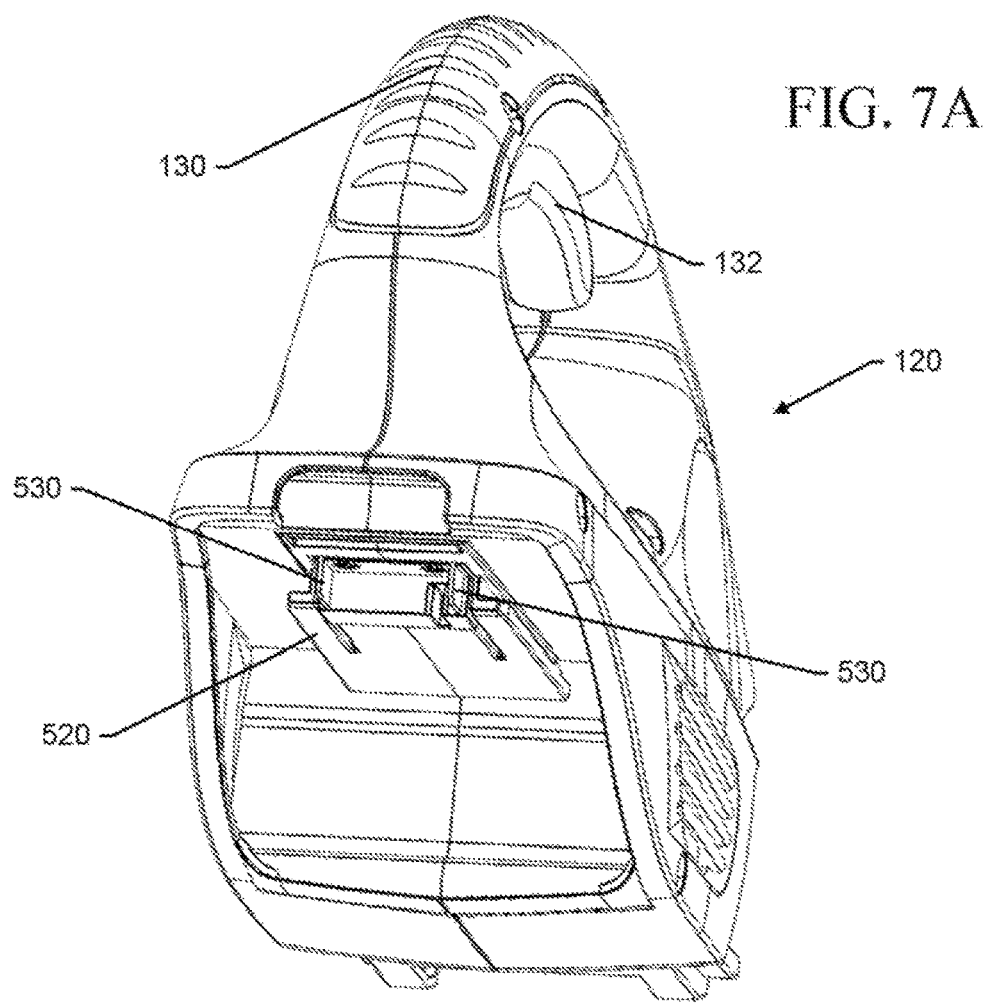
FIG. 7A is a rear perspective view of the power head portion with battery removed in accordance with an example embodiment.
Figure 7B:
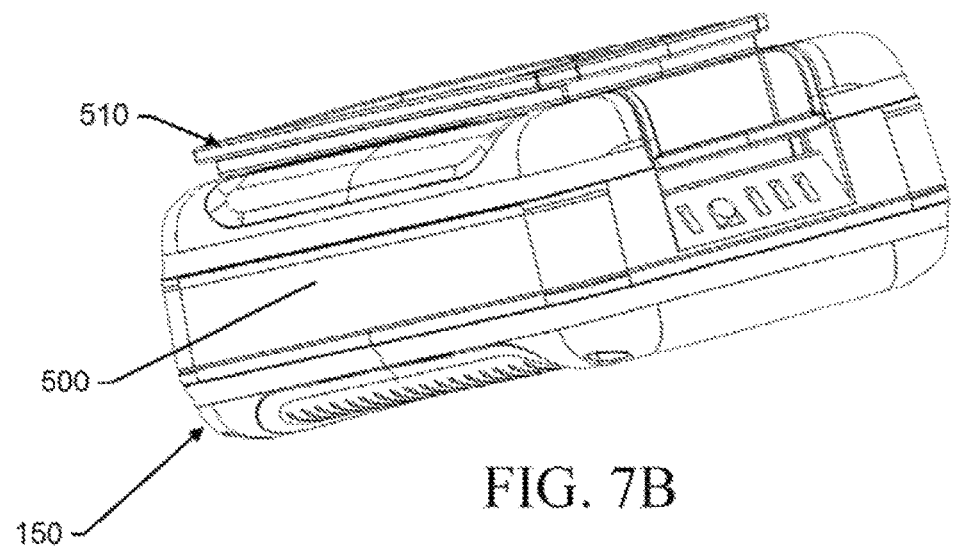
FIG. 7B illustrates a perspective view of the battery in isolation in accordance with an example embodiment.

FIG. 7, which is defined by FIGS. 7A and 7B, illustrates the battery 150 and its interface with the power head portion 120 in accordance with an example embodiment. The battery 150 includes a housing 500 that houses one or more individual battery cells. As can be seen in FIG. 3, the battery cells may lie in the housing 500 such that the longitudinal centerlines of the cells are parallel to each other, but substantially perpendicular to the common axis 170. Various ones of the battery cells may be connected in series and/or parallel to define any desirable operating voltage (e.g., 20V), and the battery cells may also be connected to output power terminals that operably couple to corresponding terminals of the power head portion 120 when the battery 150 is mated with the power head portion 120.

As shown in FIG. 7B, a top portion of the housing 500 may include a receiving portion 510 that is configured to mate with a rail structure 520 that is provided at a rear portion of the power head portion 120. The rail structure 520 may include longitudinally extending rails (e.g., L shaped, outwardly facing rails) that extend substantially parallel to the common axis 170. The rail structure 520 may fit inside the receiving portion 510 of the battery 150 and slidably engage with grooves formed in the receiving portion 510 to enable the battery 150 to be slid into the power head portion 120 to the point at which electrical contact is made between contacts on the battery 150 and corresponding contacts 530 on the rail structure 520. Electrical power may then be transferred from the battery 150 to the motor 140 under the control of the control unit and/or the power button 134 or operating member 132.

A blower of an example embodiment may therefore include a blower attachment portion, a power head portion, a motor, a fan, a battery and an intake chamber. The blower attachment portion may include a blower attachment housing. The power head portion may include a power head housing that further includes a handle operably coupled thereto. The motor may be disposed in the power head housing. The fan may be disposed in the blower attachment housing. The fan may be operably coupled to the motor via a shaft to force air through a blower tube responsive to operation of the motor. The battery may be configured to be operably coupled to the motor to selectively power the motor. The intake chamber may be disposed between the motor and the fan to enable the air that is forced through the blower tube to enter the blower between the motor and the fan.

In some embodiments, the features or operations of the blower described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, (1) the motor, the fan and the shaft may each share a common axis. In some cases, (2) the shaft passes through the intake chamber. In an example embodiment, (3) a portion of the shaft that passes through the intake chamber may be covered by a shaft housing. In some examples, (4) an intake screen may be provided at a front portion of the intake chamber, and the shaft may pass through the intake screen. In some embodiments, (5) a longitudinal axis of the battery may be substantially parallel to the common axis. In some cases, (6) the longitudinal axis of the battery may be collinear with the common axis. In some examples, (7) the intake chamber may be defined by a rear wall, an intake screen and a plurality of sidewall members. The rear wall may face an intake screen at a front portion of the intake chamber. The sidewall members may extend from peripheral edges of the intake screen toward the rear wall. In an example embodiment, (8) at least one of the sidewall members may extend over a top portion of the intake chamber. In some cases, (9) at least one louver may be formed between the sidewall members opposite the at least one of the sidewall members that extends over the top portion of the intake chamber to enable noise to leave the intake chamber via a bottom or side of the intake chamber (e.g., in a direction away from an operator of the blower).

In some embodiments, any or all of (1) to (9) may be employed in addition to the optional modifications or augmentations described below. For example, in some embodiments, (10) the shaft may be a split shaft, and the power head portion may be separable from the blower attachment portion. Additionally or alternatively, (11) the shaft may include a driving portion at a distal end of a portion of the shaft that is coupled to the motor, and a driven portion at a distal end of a portion of the shaft that is coupled to the fan. The driven portion and the driving portion are configured to engage each other responsive to the power head portion and the blower attachment portion being in an engaged state. Additionally or alternatively, (12) a guide sleeve may be disposed coaxial with the driving portion, and a guide receiver may be disposed coaxial with the driven portion. The guide sleeve may be configured to fit within the guide receiver during transition of the power head portion and the blower attachment portion to the engaged state. Additionally or alternatively, (13) a length of the guide sleeve may be substantially equal to a depth of the guide receiver. Additionally or alternatively, (14) the length of the guide sleeve may be longer than a length of the driving portion. Additionally or alternatively, (15) the power head portion and the blower attachment portion may be configured to be slidably engaged to each other to transition into and out of the engaged state via a first rail assembly and a second rail assembly that correspond to a first set of guide grooves and a second set of guide grooves. Additionally or alternatively, (16) the first rail assembly is configured to engage the second set of guide grooves, and the second rail assembly is configured to engage the first set of guide grooves prior to the guide sleeve engaging the guide receiver responsive to transition of the power head portion and the blower attachment portion to the engaged state. Additionally or alternatively, (17) the blower may further include a first contact assembly disposed at the blower attachment portion and a second contact assembly disposed at the power head portion. The first and second contact assemblies may mate with each other responsive to the power head portion and the blower attachment portion being in the engaged state. Additionally or alternatively, (18) the second contact assembly may be inset into a portion of the power head housing and the first contact assembly may be disposed on a protruding member of the blower attachment housing. Additionally or alternatively, (19) the first and second contact assemblies may be configured to contact each other after the driven portion contacts the driving portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blower comprising:
   a blower attachment portion comprising a blower attachment housing;
   a power head portion comprising a power head housing having a handle operably coupled thereto;
   a motor disposed in the power head housing;
   a fan disposed in the blower attachment housing, the fan being operably coupled to the motor via a shaft to force air through a blower tube responsive to operation of the motor;
   a battery configured to be operably coupled to the motor to selectively power the motor; and
   an intake chamber disposed between the motor and the fan to enable the air that is forced through the blower tube to enter the blower between the motor and the fan;
   wherein the motor, the fan and the shaft each share a common axis;
   wherein the shaft passes through the intake chamber;
   wherein an intake screen is provided at a front portion of the intake chamber, and wherein the shaft passes through the intake screen.

2. A blower comprising:
   a blower attachment portion comprising a blower attachment housing;
   a power head portion comprising a power head housing having a handle operably coupled thereto;
   a motor disposed in the power head housing;
   a fan disposed in the blower attachment housing, the fan being operably coupled to the motor via a shaft to force air through a blower tube responsive to operation of the motor;
   a battery configured to be operably coupled to the motor to selectively power the motor; and
   an intake chamber disposed between the motor and the fan to enable the air that is forced through the blower tube to enter the blower between the motor and the fan;
   wherein the intake chamber is defined by a rear wall, an intake screen and a plurality of sidewall members, wherein the rear wall faces the intake screen at a front portion of the intake chamber, and wherein the plurality of sidewall members extend from peripheral edges of the intake screen toward the rear wall.

3. The blower of claim 2, wherein at least one of the plurality of sidewall members extends over a top portion of the intake chamber.

4. The blower of claim 3, wherein at least one louver is formed between the plurality of sidewall members opposite the at least one of the plurality of sidewall members that extends over the top portion of the intake chamber to enable noise to leave the intake chamber via a side or bottom of the intake chamber.

5. The blower of claim 2, wherein the shaft is a split shaft, and the power head portion is separable from the blower attachment portion.

6. The blower of claim 5, wherein the shaft includes a driving portion at a distal end of a portion of the shaft that is coupled to the motor, and a driven portion at a distal end of a portion of the shaft that is coupled to the fan, and wherein the driven portion and the driving portion are configured to engage each other responsive to the power head portion and the blower attachment portion being in an engaged state.

7. A blower comprising:
   a blower attachment portion comprising a blower attachment housing;
   a power head portion comprising a power head housing having a handle operably coupled thereto;
   a motor disposed in the power head housing;
   a fan disposed in the blower attachment housing, the fan being operably coupled to the motor via a shaft to force air through a blower tube responsive to operation of the motor;
   a battery configured to be operably coupled to the motor to selectively power the motor; and
   an intake chamber disposed between the motor and the fan to enable the air that is forced through the blower tube to enter the blower between the motor and the fan;
   wherein the shaft is a split shaft, and the power head portion is separable from the blower attachment portion;
   wherein the shaft includes a driving portion at a distal end of a portion of the shaft that is coupled to the motor, and a driven portion at a distal end of a portion of the shaft that is coupled to the fan, and wherein the driven portion and the driving portion are configured to engage each other responsive to the power head portion and the blower attachment portion being in an engaged state;
   wherein a guide sleeve disposed coaxial with the driving portion, and a guide receiver disposed coaxial with the driven portion, and wherein the guide sleeve is configured to fit within the guide receiver during transition of the power head portion and the blower attachment portion to the engaged state.

8. The blower of claim 7, wherein the motor, the fan and the shaft each share a common axis.

9. The blower of claim 8, wherein the shaft passes through the intake chamber.

10. The blower of claim 9, wherein a portion of the shaft that passes through the intake chamber is covered by a shaft housing.

11. The blower of claim 8, wherein a longitudinal axis of the battery is substantially parallel to the common axis.

12. The blower of claim 11, wherein the longitudinal axis of the battery is collinear with the common axis.

13. The blower of claim 7, wherein a length of the guide sleeve is substantially equal to a depth of the guide receiver.

14. The blower of claim 13, wherein the length of the guide sleeve is longer than a length of the driving portion.

15. The blower of claim 14, wherein the power head portion and the blower attachment portion are configured to be slidably engaged to each other to transition into and out of the engaged state via a first rail assembly and a second rail assembly that correspond to a first set of guide grooves and a second set of guide grooves.

16. The blower of claim 15, wherein the first rail assembly is configured to engage the second set of guide grooves, and the second rail assembly is configured to engage the first set of guide grooves prior to the guide sleeve engaging the guide receiver responsive to transition of the power head portion and the blower attachment portion to the engaged state.

17. The blower of claim 16, further comprising a first contact assembly disposed at the blower attachment portion and a second contact assembly disposed at the power head portion, wherein the first and second contact assemblies mate with each other responsive to the power head portion and the blower attachment portion being in the engaged state.

18. The blower of claim 17, wherein the second contact assembly is inserted into a portion of the power head housing and the first contact assembly is disposed on a protruding member of the blower attachment housing.

19. The blower of claim 18, wherein the first and second contact assemblies are configured to contact each other after the driven portion contacts the driving portion.

* * * * *